(No Model.)
M. A. HEATH.
BALE COVERING.
No. 518,949.　　　　　　　　　　　Patented May 1, 1894.
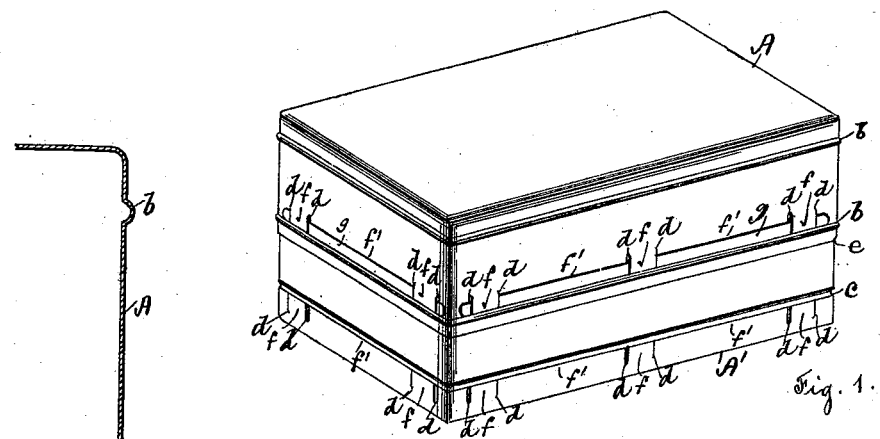
Fig. 1.
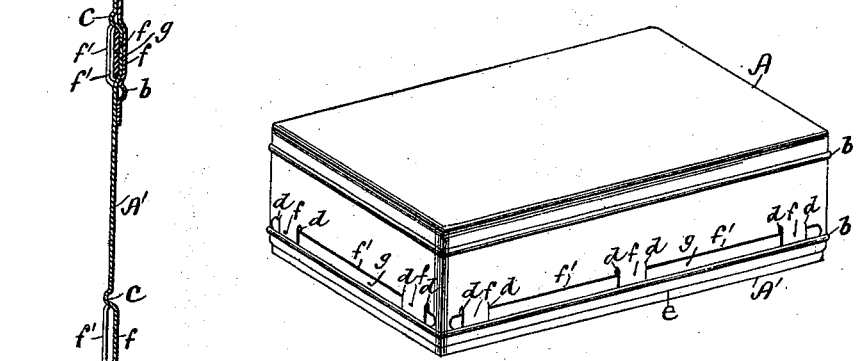
Fig. 2.
Fig. 3.
Witnesses
Geas. F. Schuels
Jos. J. Scholfield
Inventor.
Mark A. Heath,
By his Attorney
J. Scholfield
THE NATIONAL LITHOGRAPHING COMPANY,
WASHINGTON, D. C.

UNITED STATES PATENT OFFICE.

MARK A. HEATH, OF PROVIDENCE, RHODE ISLAND.

BALE-COVERING.

SPECIFICATION forming part of Letters Patent No. 518,949, dated May 1, 1894.

Application filed July 27, 1891. Serial No. 400,876. (No model.)

*To all whom it may concern:*

Be it known that I, MARK A. HEATH, a citizen of the United States, residing at Providence, in the State of Rhode Island, have invented a new and useful Improvement in Metallic Bale-Coverings, of which the following is a specification.

My invention consists in the telescoping construction of the two parts of the metallic bale covering, and in means for connecting the said parts to each other, as hereinafter fully set forth.

Figure 1, represents a perspective view showing the bale covering in its primary closed condition, as employed for packing cotton or other material at the plantation. Fig. 2, represents the same as closed to smaller dimensions at the final press. Fig. 3, represents an enlarged detail section, showing the manner of attaching the parts to each other.

In the accompanying drawings, A represents one of the metallic parts or shells of the bale covering, and A' the other, the shell A' being made small enough to loosely enter the cavity of the shell A. The outer or larger shell A is provided with the outwardly turned strengthening beads $b$ and $b$, and the inner shell A' is provided with the inwardly turned strengthening beads $c$. The parts A and A' are also provided with slits $d, d$, which are made perpendicular to the edge $e$ of the shell, the portion $f$ of the metallic plate between the slits $d, d$, being bent outward, and the portion $f'$ in the opposite direction, so that a thin locking rod $g$ may be readily passed over the portion $f'$; and under the portion $f$. The slits $d, d$, of the shells A, A', are made in line with each other, and the included portions $f$ and $f'$ of the outer shell, and $f$ and $f'$ of the inner shell are bent correspondingly outward and inward, so as to fit each other when the shells A, A', are placed together, as shown by the detail section Fig. 3, and when the shells are so placed together, the insertion of the locking rod $g$ between the outwardly and inwardly bent portions, will serve to lock the shells firmly to each other. The outer shell A is provided with one row of slits $d, d$, near its edge, while the inner shell A' is provided with two rows, one row being as in the shell A, near the edge, and the other near the bottom, thus adapting the bale covering for a subsequent final compression, by telescoping the shells upon each other.

In baling cotton the bale is first formed at the plantation with the material in a comparatively loose condition and then shipped to the finishing press, the relative position of the shells A, A'; when joined at the plantation, being shown in Fig. 1, while the position of the shells when subjected to the final press, is shown in Fig. 2, the said shells being locked together by means of a thin locking rod $g$, which passes under the outwardly bent portions $f$.

I claim as my invention—

1. The combination with the inner and outer shells, provided with the slits, and the corresponding outwardly bent portions between the slits registering with each other, of the locking rod which passes through the slits under the outwardly turned portions to lock the shells to each other, substantially as described.

2. A metallic bale covering, composed of the inner and outer telescoping shells, both of which are provided near their edges with the slits, and the corresponding outwardly bent portions between the slits, the inner shell being also provided with corresponding slits and outwardly bent portions near its bottom registering with each other, whereby the bale covering after being first filled with the material in a comparatively loose condition for transportation, may be still further compressed and secured, substantially as described.

MARK A. HEATH.

Witnesses:
S. SCHOLFIELD,
CHARLES F. SCHMELZ.